United States Patent
Schrage et al.

[15] 3,699,186
[45] Oct. 17, 1972

[54] POLYOLEFINS MODIFIED WITH UNSATURATED GLYCIDYL COMPOUNDS AND POLYACRYLATE COMPOUNDS

[72] Inventors: Albert Schrage, East Orange; Philip D. Readio, Sparta, both of N.J.

[73] Assignee: Dart Industries Inc., Los Angeles, Calif.

[22] Filed: March 30, 1971

[21] Appl. No.: 129,629

[52] U.S. Cl.............260/836, 260/94.7 A, 260/827, 260/878 R
[51] Int. Cl. .............................................C08g 45/04
[58] Field of Search.......260/836, 94.7 A; 117/100 C

[56] References Cited

UNITED STATES PATENTS

| | | | |
|---|---|---|---|
| 3,423,481 | 1/1969 | Mizutani | 260/836 |
| 3,179,485 | 4/1965 | Kawasaki | 204/159.17 |
| 3,322,661 | 5/1967 | Yoshikawa | 204/159.17 |

FOREIGN PATENTS OR APPLICATIONS

| | | | |
|---|---|---|---|
| 1,038,726 | 8/1966 | Great Britain | 260/857 |
| 3,713,880 | 9/1962 | Japan | |
| 4,218,327 | 9/1967 | Japan | |
| 4,316,392 | 7/1968 | Japan | |
| 4,328,461 | 12/1968 | Japan | |
| 4,473,345 | 3/1969 | Japan | |

OTHER PUBLICATIONS

Chemical Abstracts Vol. Page Year

Chemical Abstracts 59 7722c 1963
Chemical Abstracts 68 22496x 1968
Chemical Abstracts 70 58846s 1969
Chemical Abstracts 70 79086j 1969
Chemical Abstracts 71 22877j 1969
Chemical Abstracts 71 22878k 1969
Chemical Abstracts 71 22879m 1969
Chemical Abstracts 71 14138d 1969

*Primary Examiner*—Paul Lieberman
*Attorney*—Fred S. Valles and Richard A. Dannells, Jr.

[57] ABSTRACT

In modified polyolefin compositions prepared by reacting an olefin polymer with a polymerizable compound generally defined by (I)

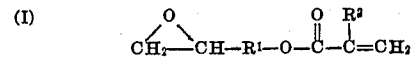

or (II)

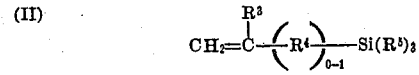

in the presence of an organic peroxide the melt flow may be controlled by including in the reactants a modifier comprising acrylic or methacrylic esters of diols or triols. The reaction product is particularly suitable for being reinforced with filamentary material such as glass fibers or asbestos or as a coating on metallic surfaces.

8 Claims, No Drawings

POLYOLEFINS MODIFIED WITH UNSATURATED GLYCIDYL COMPOUNDS AND POLYACRYLATE COMPOUNDS

This invention relates to improvements in modified polyolefin compositions having good adhesiveness characteristics.

Modified polyolefin compositions having good adhesiveness characteristics, particularly toward polar materials, are described in copending application Ser. No. 81,526, filed Oct. 16, 1970. These compositions are formed, in general, by reacting an olefin polymer with certain ethylenically unsaturated polymerizable compounds in the presence of an organic peroxide. While the resulting modified polyolefin compositions exhibit adhesiveness characteristics which are far superior to the unmodified polyolefins the melt flow of the compositions is undesirably high. As is well known, polymers having undesirably high melt flow values also undergo a decrease in physical properties such as tensile strength, flexural strength and impact strength.

This invention provides a solution to the problems of unduly high melt flow in these modified polyolefin compositions. Briefly, the invention involves the use of certain acrylic esters of diols and triols as modifiers in the reaction of the olefin polymer with the ethylenically unsaturated polymerizable compound in the presence of the organic peroxide. These esters are merely charged along with the other reactants to a reactor and the entire mixture is subjected to the usual polymerization conditions. The resulting modified polyolefin compositions have far lower melt flow values than such compositions prepared without the use of the modifiers.

The improved modified polyolefin compositions to which this invention relates are those derived by reacting an olefin polymer, 0.01 to 10 percent by weight based on the olefin polymer of a polymerizable compound defined by

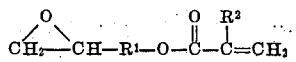

or

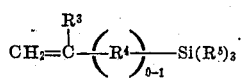

wherein $R^1$, $R^2$, $R^3$, $R^4$, and $R^5$ are hereinafter defined, and 0.01 to 10 percent by weight based on the olefin polymer of a modifier comprising acrylic esters of diols or triols in the presence of an organic peroxide.

The olefin polymer is one which is derived from alpha-olefin monomers having two to 10 carbon atoms. Included among these are polyethylene, polypropylene, poly(butene-1), poly(4-methyl-pentene-1), ethylene-propylene random and block copolymers and terpolymers of ethylene-propylene-butene-1 as well as many others.

The polymerizable compounds include those defined by

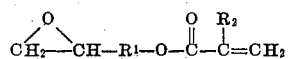

wherein
$R^1$ is a cyclic, straight or branched chain alkylene group having one to 20 carbon atoms;

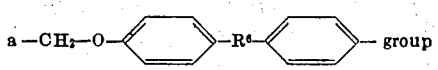

wherein $R^6$ is a straight or branched chain alkylene radical having one to 10 carbon atoms, oxygen, sulfur, amino,

or

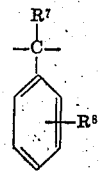

wherein $R^7$ is H or lower alkyl and $R^8$ is lower alkyl;

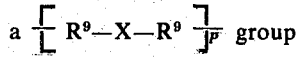

wherein each $R^9$ is a straight or branched chain lower alkylene, X is an amino group or an oxygen or sulfur atom, and $p$ is an integer of one to 20;

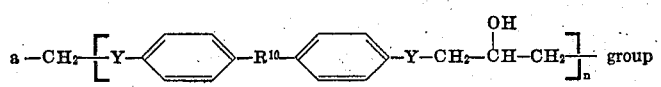

wherein Y represents oxygen or sulfur atoms, $R^{10}$ is a straight or branched chain alkylene radical having one to 10 carbon atoms,

oxygen, sulfur, or

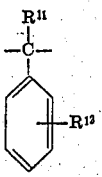

wherein $R^{11}$ is H or lower alkyl and $R^{12}$ is lower alkyl; and $n$ is an integer of 1 to 20;

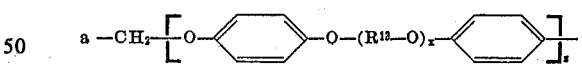

group
wherein $R^{13}$ is lower alkyl, $x$ is an integer of 1 to 10 and $z$ is an integer of 1 to 10;

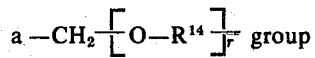

wherein $R^{14}$ is lower alkyl and $r$ is an integer of 1 to 100;

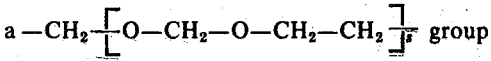

wherein $s$ is an integer of 1 to 100; and $R^2$ is H or $CH_3$. Preferably, $R^1$ is a $C_1-C_{18}$ alkylene group and $R^2$ is H or $CH_3$.

By way of specific example of some of the compounds included in this definition there may be mentioned glycidyl acrylate; glycidyl methacrylate; the acrylic and methacrylic esters of the monoglycidyl ether of sulfonyl bis-phenol, the monoglycidyl ether of a $C_1$ to $C_{18}$ bisphenol, the monoglycidyl ether of oxybisphenol, the monoglycidyl ether of thiobisphenol, the monoglycidyl ether of aminobisphenol and the monoglycidyl ether of α, α-bis(p-hydroxyphenyl) tolylethane; the acrylic and methacrylic esters of 3-oxy-6,7-epoxyheptanol, 3-aza-6,7-epoxyheptanol, or 3-thia-6,7-epoxyhaptanol; the reaction products of one mole of acrylic or methacrylic acid with one mole of polyphenylenesulfide diglycidyl ether, polyphenyleneamine diglycidyl ether, or polyphenyleneoxide diglycidyl ether; the reaction products of one mole of acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the polycondensation product of epichlorohydrin with α, α-bis(p-hydroxyphenyl) tolylethane or α, α-bis(p-thiophenyl) tolylethane; the acrylic and methacrylic esters of poly ($C_1$—$C_4$ alkyleneoxide glycol) monoglycidyl ether; and the acrylic and methacrylic esters of poly [(co-alkylene-phenylene-oxide) glycol] monoglycidyl ether. All of these compounds are disclosed in copending application Ser. No. 81527 filed Oct. 16, 1970.

Also included within the polymerizable compounds are those compounds defined by

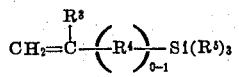

wherein $R^3$ is hydrogen or an alkyl radical having one to four carbon atoms;

$R^4$ is a straight, branched or cyclic alkylene radical having one to 10 carbon atoms with or without pendant glycidoxy groups; a substituted or unsubstituted phenylene group with or without pendant glycidoxy groups;

a 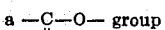 group a 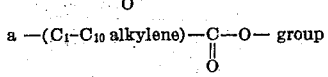 group with or without pendant glycidoxy groups;

a 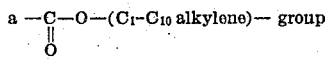 group with or without pendant glycidoxy groups; or a 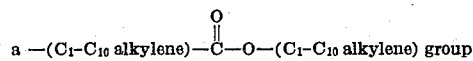 group with or without pendant glycidoxy groups; and $R^5$ is halogen (bromine or chlorine in particular), an alkoxy radical having one to 10 carbon atoms, or an acyloxy radical having one to 10 carbon atoms. Preferably, $R^4$ is absent or a $C_1$—$C_{10}$ alkylene group while $R^3$ and $R^5$ are as described above.

Included within the above defined group of compounds are the following by structure

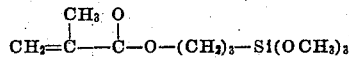

$CH_2=CH—Si(OC_2H_5)_3$

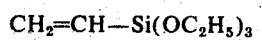

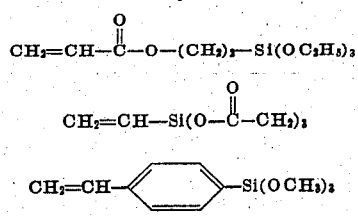

Such compounds are commercially available.

The acrylic esters of diols or triols which may be used as the modifier in the invention include those defined by the following formula

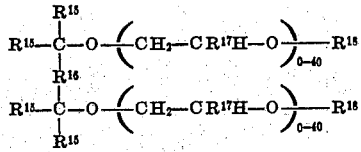

wherein each $R^{15}$ is H or $C_1$—$c_4$ alkyl;

$R^{16}$ is

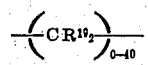

wherein $R^{19}$ is H or $C_1$-$C_4$ alkyl;

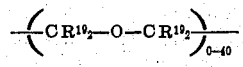

wherein $R^{19}$ is defined above;

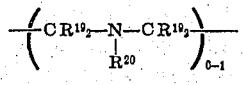

wherein $R^{19}$ is defined above and $R^{20}$ is H or

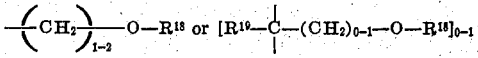

wherein $R^{19}$ is defined above; $R^{17}$ for each unit is H or —$CH_3$; and $R^{18}$ is

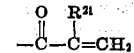

wherein $R^{21}$ is H or —$CH_3$.

The above acrylic esters are either commercially available or may be prepared by conventional direct esterification techniques involving reaction between acrylic acid or methacrylic acid and the particular diol or triol. Conventional acylation techniques may also be used wherein acryloyl chloride or methacryloyl chloride are substituted for the acids in reacting with the diols or triols. Any diol or triol coming within the scope of the corresponding portion of the above structural formula may be used for such preparation. For example, ethylene glycol, diethylene glycol, triethylene glycol, tetraethylene glycol, propylene glycol, dipropylene glycol, polypropylene glycols, hexylene glycol, 2-methyl-2-ethyl-1,3-propanediol, 2-ethyl-1,3-hexanediol, 1,5-pentanediol, glycerine, 1,2,6-hexanetriol, triethanol amine, diethanol amine, 1,4-butanediol, polyethylene glycol, 1,2,4-hexanetriol, trimethylol ethane, trimethylol propane, poly(oxypropylene)-poly(oxyethylene) glycols and alkylene triols, poly(oxypropylene-oxyethylene) glycols and alkylene triols, and the like.

The preferred acrylic esters are those defined by the formula

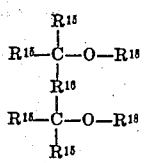

wherein each $R^{15}$ is H or $-CH_3$; $R^{16}$ is

or

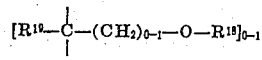

wherein $R^{19}$ is H or $C_1-C_4$ alkyl; and $R^{18}$ is

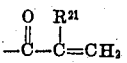

wherein $R^{21}$ is H or $-CH_3$.

As mentioned above the improved modified polyolefin compositions of this invention are derived by reacting the olefin polymer, the ethylenically unsaturated compound and the acrylic ester or mixture of acrylic esters in the presence of an organic peroxide. Normally, such organic peroxide is employed in an amount in the range of about 0.01 by 5 percent by weight based on the olefin polymer.

Suitable organic peroxides useful in this invention include both solid and liquid organic peroxides. In order to insure good distribution of the peroxide throughout the mixture of ingredients prior to reaction it is preferred to use a liquid form of the peroxide. Thus, for convenience, those organic peroxides which are normally liquid or which become liquid at or near the temperature at which the particular reaction is run are preferred over the solid-type organic peroxides. However, by dissolving the solid organic peroxides in a suitable organic solvent, that is one that has no substantial adverse effect on free radical polymerization reactions, a suitable physical form is obtained which can be used with substantially equal success in the process of the invention. Since the solvent, for this purpose, merely functions as a carrier for the solid organic peroxide it makes no difference whether or not it becomes vaporized prior to reaching reaction temperature since the peroxide at that point in the process has already been distributed throughout the ingredients.

Some examples of suitable peroxides include di-t-butyl peroxide, t-butyl hydroperoxide, methyl ethyl ketone peroxide, t-butyl perbenzoate, t-butyl peracetate, t-butyl peroxypivalate, acetyl peroxide, t-butyl peroctoate, t-butyl peroxyisobutyrate, decanoyl peroxide, lauroyl peroxide, benzoyl peroxide, 2,5-dimethylhexane-2,5-diperoxybenzoate, cyclohexanone peroxide, cumene hydroperoxide, p-methane hydroperoxide, di-t-butyl-diperoxyphthalate, cumyl peroxide, caproyl peroxide, and the like. Of course, there are additional organic peroxides in this group but are too numerous to attempt to individually name. In the event it is desirable to use a solvent some which would be suitable include benzene, mineral spirits, toluene, chlorobenzene, dichlorobenzene, acetone, dimethyl phthalate, t-butyl alcohol, anisole, decalin, xylene and others which possess the required inertness to the reaction. As mentioned previously, it is preferred that the organic peroxide be in a liquid form or capable of dissolution in an substantially inert organic solvent at or near the temperature at which the particular reaction is carried out.

It is pointed out that oxygen cannot be employed in the process even though it is sometimes regarded as a free radical initiator. Oxygen is known to cause deleterious effects on polymerizable monomers such as the ethylenically unsaturated compounds and acrylic esters used in this invention (see page 36 of the reprint of Chapters I–IV from Monomeric Acrylic Esters by E. H. Riddle, 1954).

Selection of a particular organic peroxide or mixture of organic peroxides of the type mentioned above may be easily determined based on the temperature at which the particular reaction is to be carried out and the corresponding decomposition rate of the peroxides as evidenced by their respective half-lives. The half-lives of peroxides are well known and may be readily ascertained (see U.S. Pat. No. 3,293,233 and Encyclopedia of Chemical Technology, Kirk-Othmer, 2nd Edition, Vol. 14, p. 810–813).

The manner in which the materials are reacted is not critical. Thus, for example, it may be expeditious to merely admix the materials using any type of mixing device and, after charging the mixture to a reactor, heating the mixture to an optimum temperature whereat the organic peroxide decomposes to generate free radicals. The reaction may be conducted with all of the ingredients dissolved in inert solvents or while in a molten state. The olefin polymer may be molten or in solid particulate form while the remaining ingredients are in a liquid or dissolved state.

The temperature is also not critical for conducting the reaction except to the extent that it must not be so high as to cause degradation of the olefin polymer, the ethylenically unsaturated compound, or the acrylic esters. As mentioned above, the temperatures employed go hand-in-hand with the particular peroxide selected. For example, if it is desired to conduct the reaction at a low temperature one would most likely select a peroxide having a low temperature 10-hr. half-life, e.g. acetyl peroxide for use at about room temperature.

The pressure at which the reaction is conducted is not critical and, in general, good results can be obtained at pressures in the range of atmospheric up to about 1000 psi. For practical reasons it is convenient to operate at pressures of atmospheric up to about 200 psi.

Since oxygen has some adverse effect on the reaction it is desirable to conduct the reaction in a substantially oxygen-free atmosphere if possible. While small amounts of oxygen can probably be tolerated in the system effort should be made to prevent introduction of additional oxygen over and above what may be initially present. Preferably, the reactor is purged with an inert gas prior to conducting the reaction.

In conducting the reaction using a solid form of polyolefin it is desirable to substantially completely decompose the organic peroxide before recovering the product as the presence of any residual peroxide, even in small quantities, may adversely affect the resulting composition in subsequent compounding, molding or extruding operations. Of course, if one can tolerate certain of the adverse effects then the extent of decomposition of the peroxide may be somewhat incomplete.

The reaction product, that is the resulting composition, of this invention is particularly suited for reinforcement with filamentary material such as glass fibers or asbestos. Such reinforced compositions may be produced in accordance with conventional techniques, see U.S. Pat. No. 3,416,990, U.S. Pat. No. 3,453,356 and U.S. Pat. No. 3,042,570. In addition, the reaction product is useful in coating metallic surfaces, e.g. cans and the like, due to the adhesiveness properties it possesses.

Other additives may be incorporated in the reaction product including fillers, pigments, stabilizers, antioxidants, slip agents, anti-static agents, mold release agents, flame retardants and the like.

The following examples will serve to further illustrate the invention.

EXAMPLE 1

A mixture comprising 100 parts by weight polypropylene particles (average size in the range of 0.01 mm to 4 mm), 0.5 part by weight glycidyl acrylate, 0.5 part by weight t-butyl peracetate (75 percent solution in benzene) and 1.55 parts by weight ethylene glycol dimethacrylate were mixed in a Waring blender and charged to a reactor with a paddle stirrer. The dry-appearing mixture was stirred to distribute the materials while first purging the system with argon and then heating to about 125° C under autogenous pressure. The mixture was maintained at about 125° C for about 4 hours while continuing the stirring and then cooled and subjected to vacuum to remove any volatiles present. The resulting composition was recovered directly from the reactor in a particulate form.

Using the same procedure outlined in the previous paragraph a second composition was prepared except that 1.76 parts by weight 1,3-butylene dimethacrylate were substituted for the ethylene glycol dimethacrylate. The product again was recovered in a particulate form.

For comparison, a third composition was prepared using the same procedure except that no ethylene glycol dimethacrylate or 1,3-butylene dimethacrylate was employed. The product composition was recovered in a particulate form.

Each of the above compositions was tested for melt flow (230° C) in accordance with ASTM D-1238 and then blended with 20 weight percent chopped glass fibers (¼ inch, OCF 885) for testing for flexural strength and flexural modulus properties in accordance with ASTM D-790-66. The results of these evaluations are indicated in the following table.

TABLE 1 c

| Sample No. | EGDM a (Parts by Weight) | BDM b (Parts by Weight) | Melt Flow | Flexural Strength (psi) | Flexural Modulus(psi) ($\times 10^{-5}$) |
|---|---|---|---|---|---|
| 1 | 1.55 | — | 36 | 15,400 | 4.5 |
| 2 | — | 1.76 | 28 | 14,900 | 4.9 |
| 3 | — | 1.76 | 38 | 14,900 | 4.6 |
| 4 | — | — | 55+ | 15,300 | 4.8 | a ethylene glycol dimethacrylate
b 1,3-butylene dimethacrylate
c all samples prepared using 0.5 part by weight peroxide

EXAMPLE 2

A similar series of compositions were prepared as in Example 1 for comparison except that the mixtures being reacted comprised 100 parts by weight polypropylene, 0.5 part by weight glycidyl acrylate, 0.25 part by weight t-butyl peracetate and (1) 0.78 part by weight ethylene glycol dimethacrylate, or (2) 1.55 part by weight ethylene glycol dimethacrylate, or (3) 0.5 part by weight trimethylol propane trimethacrylate, or (4) 1.0 part by weight trimethylol propane trimethacrylate, or (5) no additional ingredient. The compositions were tested as in Example 1 and the results are indicated in the following table.

TABLE 2 c

| Sample No. | EGDM a (Parts by Weight) | TMPTM b (Parts by Weight) | Melt Flow | Flexural Strength (psi) | Flexural Modulus(psi) ($\times 10^{-5}$) |
|---|---|---|---|---|---|
| 1A | 0.78 | — | 20 | 16,400 | 4.7 |
| 1B | 0.78 | — | 18 | 15,800 | 4.7 |
| 2 | 1.55 | — | 13 | 15,200 | 4.4 |
| 3A | — | 0.5 | 15 | 15,700 | 5.4 |
| 3B | — | 0.5 | 19 | 16,300 | 5.6 |
| 4A | — | 1.0 | 4 | 14,500 | 5.1 |
| 4B | — | 1.0 | 10 | 14,600 | 5.0 |
| 5A | — | — | 38 | 12,000 | 3.8 |
| 5B | — | — | 38 | 14,300 | 4.6 | a ethylene glycol dimethacrylate
b trimethylol propane trimethacrylate
c all samples prepared using 0.25 part by weight peroxide

EXAMPLE 3

Another series of compositions were prepared as in Example 1 for comparison except that the mixtures being reacted comprised 100 parts by weight polypropylene, 1.0 part by weight glycidyl acrylate, 0.5 part by weight t-butyl peracetate and (1) 1.0 part by weight trimethylol propane trimethacrylate, or (2) no additional ingredient. The compositions were tested as in Example 1 and the results are indicated in the following table.

TABLE 3 b

| Sample No. | TMPTM a (Parts by Weight) | Melt Flow | Flexural Strength (psi) | Flexural Modulus(psi) ($\times 10^{-5}$) |
|---|---|---|---|---|
| 1A | 1.0 | 22 | 14,300 | 4.7 |
| 1B | 1.0 | 24 | 15,200 | 5.1 |
| 2A | — | 62 | 14,600 | 4.3 |
| 2B | — | 54 | 15,100 | 4.4 |
| 2C | — | 48 | 14,100 | 4.5 | a trimethylol propane trimethacrylate
b all samples prepared using 0.5 part by weight peroxide

EXAMPLE 4

Another series of compositions were prepared as in Example 1 for comparison except that the mixtures being reacted comprised 100 parts by weight polypropylene, 0.2 part by weight γ-methacryloxypropyl trimethoxy silane, 0.5 part by weight t-butyl peracetate and (1) 0.78 part by weight ethylene glycol dimethacrylate, or (2) no additional ingredient. The compositions were tested as in Example 1 and the results are indicated in the following table.

TABLE 4[b]

| Sample No. | EGDM[a] (Parts by Weight) | Melt Flow | Flexural Strength (psi) | Flexural Modulus (psi) (×10⁻⁵) |
|---|---|---|---|---|
| 1 | 0.78 | 30 | 14,900 | 4.8 |
| 2A | — | 58 | 15,600 | 4.7 |
| 2B | — | 55 | 14,200 | 4.5 |
| 2C | — | 48 | 15,300 | 4.9 |

[a] ethylene glycol dimethacrylate
[b] all samples prepared using 0.5 part by weight peroxide

EXAMPLE 5

A series of compositions were prepared as in Example 1 except that in each case the ingredients were charged to a 1 liter flask which was then partially immersed in a heated oil bath and continuously rotated. The oil bath was heated sufficiently to maintain the flask at a temperature of about 125° C. About ½ hour was allowed for warm-up of the flask and the reaction was then allowed to proceed for about four hours. Each composition was recovered in a particulate form. The compositions prepared comprised 100 parts by weight polypropylene, 0.25 part by weight glycidyl acrylate, 0.10 part by weight t-butyl peracetate and (1) 0.125 part by weight ethylene glycol dimethacrylate, or (2) 0.25 part by weight ethylene glycol dimethacrylate, or (3) 0.5 part by weight ethylene glycol dimethacrylate, or (4) no additional ingredient. The compositions were tested as in Example 1 and the results are indicated in the following table.

TABLE 5[b]

| Sample No. | EGDM[a] (Parts by Weight) | Melt Flow | Flexural Strength (psi) | Flexural Modulus (psi) (×10⁻⁵) |
|---|---|---|---|---|
| 1 | 0.125 | 39 | 16,900 | 5.0 |
| 2 | 0.25 | 39 | 16,700 | 5.1 |
| 3 | 0.5 | 26 | 14,400 | 4.7 |
| 4 | — | 59 | 15,600 | 4.6 |

[a] ethylene glycol dimethacrylate
[b] all samples prepared using 0.1 part by weight peroxide

EXAMPLE 6

Using the same procedure as in Example 5 a series of compositions were prepared comprising 100 parts by weight polypropylene, 0.2 parts by weight γ-methacyloxypropyl trimethoxy silane, 0.25 part by weight of 5-butyl peracetate and (1) 0.2 part by weight ethylene glycol dimethacrylate, or (2) no additional ingredient. The compositions were tested as in Example 1 and the results are indicated in the following table.

TABLE 6[b]

| Sample No. | EGDM[a] (Parts by Weight) | Melt Flow | Flexural Strength (psi) | Flexural Modulus (psi) (×10⁻⁵) |
|---|---|---|---|---|
| 1 | 0.2 | 20 | 16,700 | 5.16 |
| 2A | — | 41 | 15,900 | 5.09 |
| 2B | — | 41 | 16,400 | 5.16 |

[a] ethylene glycol dimethacrylate
[b] all samples prepared using 0.25 part by weight peroxide From the data of Tables 1 – 6 it is theorized that the quantity of peroxide used in the reaction may have an effect on the melt flow of the compositions, the greater the quantity of peroxide the higher the melt flow. However, in each table it is also apparent that in a series of specific reactions employing a specific quantity of peroxide the use of the modifiers results in compositions of reduced melt flow and generally better physical properties.

Thus having described the invention in detail it will be understood by those skilled in the art that certain variations and modifications may be made without departing from the spirit and scope of the invention as described herein or in the appended claims.

We claim:
1. A reaction product of
A. at least one olefin polymer derived from alpha-olefin monomers having two to 10 carbon atoms,
B. at least one polymerizable compound defined by

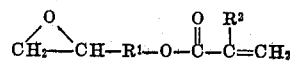

wherein
R¹ is a cyclic, straight or branched chain alkylene group having one to 20 carbon atoms;

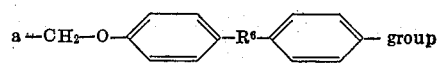

wherein R⁶ is a straight or branched chain alkylene radical having one to 10 carbon atoms, oxygen, sulfur, amino,

or

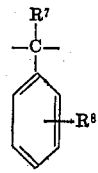

wherein R⁷ is H or lower alkyl and R⁸ is lower alkyl;

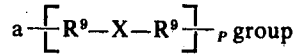

wherein each R⁹ is a straight or branched chain lower alkylene, X is an amino group or an oxygen or sulfur atom, and p is an integer of 1 to 20;

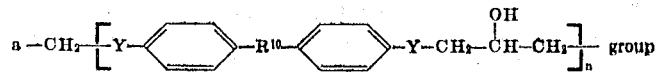

wherein Y represents oxygen or sulfur atoms, $R^{10}$ is a straight or branched chain alkylene radical having one to 10 carbon atoms,

oxygen, sulfur, or

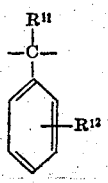

wherein $R^{11}$ is H or lower alkyl and $R^{12}$ is lower alkyl; and $n$ is an integer of 1 to 20;

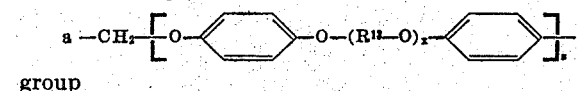

group wherein $R^{13}$ is lower alkyl, $x$ is an integer of 1 to 10 and $z$ is an integer of 1 to 10;

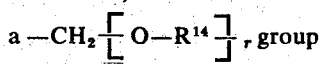

wherein $R^{14}$ is lower alkyl and $r$ is an integer of 1 to 100;

a $-CH_2 [\ O-CH_2-O-CH_2-CH_2\ ]_s$ group wherein $s$ is an integer of 1 to 100; and $R^2$ is H or $CH_3$; and C. at least one modifier defined by the formula

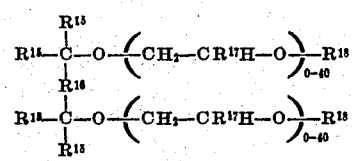

wherein each $R^{15}$ is H or $C_1$-$C_4$ alkyl; $R^{16}$ is

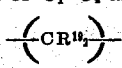

wherein $R^{19}$ is H or $C_1$-$C_4$ alkyl;

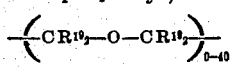

wherein $R^{19}$ is defined above;

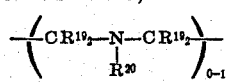

wherein $R^{19}$ is defined above and $R^{20}$ is H or

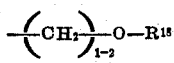

or

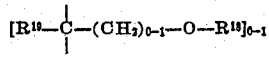

wherein $R^{19}$ is defined above; $R^{17}$ for each unit is H or $-CH_3$; and $R^{18}$ is

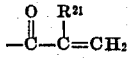

wherein $R^{21}$ is H or $-CH_3$.

in the presence of an organic peroxide wherein the polymerizable compound is present in the range of 0.01 to 10 percent by weight based on the olefin polymer and the modifier is present in the range of 0.01 to 10 percent based on the olefin polymer.

2. A reaction product according to claim 1 wherein the olefin polymer is polypropylene, polyethylene, or a copolymer of ethylene and propylene.

3. A reaction product according to claim 1 wherein the polymerizable compound is glycidyl acrylate; glycidyl methacrylate; the acrylic and methacrylic esters of the monoglycidyl ether of sulfonyl bis-phenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of $\alpha$, $\alpha$-bis(p-hydroxyphenyl) tolylethane; the acrylic and methacrylic esters of 3-oxy-6,7-epoxyheptanol, 3-aza-6,7-epoxyheptanol and 3-thia-6,7-epoxyheptanol; the reaction products of one mole of acrylic or methacrylic acid with one mole of polyphenylenesulfide diglycidyl ether, polyphenyleneamine diglycidyl ether, or polyphenyleneoxide diglycidyl ether; the reaction products of one mole of acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the poly-condensation product of epichlorohydrin with $\alpha$, $\alpha$-bis(p-hydroxy-phenyl) tolylethane or $\alpha$, $\alpha$-bis(p-thiophenyl) tolylethane; the acrylic and methacrylic esters of poly ($C_1$-$C_4$ alkylene-oxide glycol) monoglycidyl ether; and the acrylic and methacrylic esters of poly[(co-alkylene-phenylene-oxide) glycol] monoglycidyl ether.

4. The reaction product according to claim 1 wherein the polymerizable compound is glycidyl acrylate or glycidyl methacrylate; and the modifier is ethylene glycol diacrylate, ethylene glycol dimethacrylate, trimethylol triacrylate, trimethylol trimethacrylate, 1,3-butylene diacrylate, or 1,3-butylene dimethacrylate.

5. The reaction product according to claim 1 containing 5 to 90 percent by weight reinforcing filamentary material.

6. A metallic article coated with the reaction product of claim 1.

7. In a process for producing a polymer composition wherein an olefin polymer derived from alpha-olefin monomers having two to 10 carbon atoms and 0.01 to 10 percent by weight based on the olefin polymer of a polymerizable compound defined by the formula

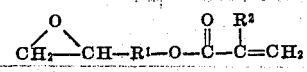

wherein $R^1$ is a cyclic, straight or branched chain alkylene group having 1 to 20 carbon atoms;

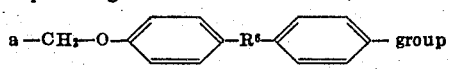

wherein $R^6$ is a straight or branched chain alkylene radical having one to 10 carbon atoms, oxygen, sulfur, amino,

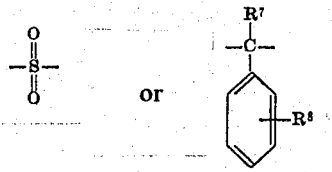

wherein $R^7$ is H or lower alkyl and $R^8$ is lower alkyl;

a [ $R^9$—X—$R^9$ ]$_p$ group wherein each $R^9$ is a straight or branched chain lower alkylene, X is an amino group or an oxygen or sulfur atom, and P is an integer of 1 to 20;

 group wherein Y represents oxygen or sulfur atoms, $R^{10}$ is a straight or branched chain alkylene radical having 1 to 10 carbon atoms,

oxygen, sulfur, or

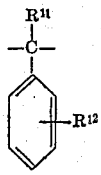

wherein $R^{11}$ is H or lower alkyl and $R^{12}$ is lower alkyl; and n is an integer of 1 to 20;

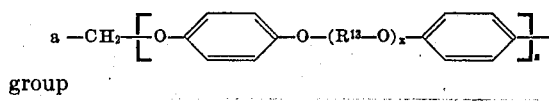
group wherein $R^{13}$ is lower alkyl, x is an integer of 1 to 10 and z is an integer of 10 to 10;

a —$CH_2$ [ O—$R^{14}$ ]$_r$ group wherein $R^{14}$ is lower alkyl and r is an integer of 1 to 100;

a —$CH_2$ [ O—$CH_2$—O—$CH_2$—$CH_2$ ]$_s$ group wherein s is an integer of 1 to 100; and $R^2$ is H or $CH_3$, or are reacted in the presence of an organic peroxide, the improvement therein of reducing the melt flow of the polymer composition by including with the ingredients being reacted 0.01% to 10% by weight based on the olefin polymer of a modifier defined by the formula

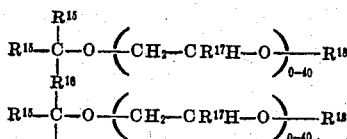

$R^{16}$ is

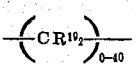

wherein $R^{19}$ is H or $C_1$-$C_4$ alkyl;

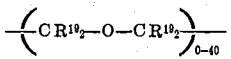

wherein $R^{19}$ is defined above;

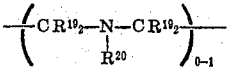

wherein $R^{19}$ is defined above and $R^{20}$ is H or

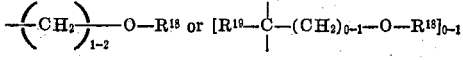

wherein $R^{19}$ is defined above; $R^{17}$ for each unit is H or —$CH_3$; and $R^{18}$ is

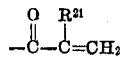

wherein $R^{21}$ is H or —$CH_3$.

8. A process according to claim 7 wherein the reaction is conducted in the absence of oxygen.

* * * * *

UNITED STATES PATENT OFFICE
CERTIFICATE OF CORRECTION

Patent No. 3,699,186  Dated October 17, 1972

Inventor(s) Albert Schrage et al

It is certified that error appears in the above-identified patent and that said Letters Patent are hereby corrected as shown below:

Column 1, line 65 the portion of the formula reading:
$R_2$ should read $R^2$

Column 11, line 29 the formula:
$-CH_2[O-CH_2-O-CH_2-CH_2]_s$ should read $-CH_2[O-CH_2-O-CH_2-CH_2]_s$ Column 11, line 42 the formula:
$(CR_2^{19})$ should read $(CR_2^{19})_{0-40}$ Column 13, line 37 "10 to 10" should be changed to
--1 to 10--

Column 14, line 18 before "$R^{16}$ is" insert

--wherein each $R^{15}$ is H or $C_1$-$C_4$ alkyl;--

Signed and sealed this 22nd day of January 1974.

(SEAL)
Attest:

EDWARD M. FLETCHER, JR.  RENE D. TEGTMEYER
Attesting Officer  Acting Commissioner of Patents